US012570232B2

(12) United States Patent
Maier et al.

(10) Patent No.: US 12,570,232 B2
(45) Date of Patent: Mar. 10, 2026

(54) VEHICLE OCCUPANT RESTRAINT SYSTEM

(71) Applicant: ZF AUTOMOTIVE GERMANY GMBH, Alfdorf (DE)

(72) Inventors: Nico Maier, Alfdorf (DE); Daniel Elija, Spraitbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/291,969

(22) PCT Filed: Jul. 25, 2022

(86) PCT No.: PCT/EP2022/070736
§ 371 (c)(1),
(2) Date: Jan. 25, 2024

(87) PCT Pub. No.: WO2023/006639
PCT Pub. Date: Feb. 2, 2023

(65) Prior Publication Data
US 2025/0100497 A1 Mar. 27, 2025

(30) Foreign Application Priority Data

Jul. 26, 2021 (DE) ..................... 10 2021 119 336.2

(51) Int. Cl.
B60R 21/214 (2011.01)
B60R 21/00 (2006.01)
B60R 21/237 (2006.01)
(52) U.S. Cl.
CPC .......... B60R 21/214 (2013.01); B60R 21/237 (2013.01); B60R 2021/0044 (2013.01); B60R 2021/0048 (2013.01)

(58) Field of Classification Search
CPC ................ B60R 21/214; B60R 21/237; B60R 2021/0044; B60R 2021/0048
See application file for complete search history.

(56) References Cited

U.S. PATENT DOCUMENTS 4,169,613 A * 10/1979 Barnett ................. B60R 21/233
280/739
8,505,966 B2 8/2013 Yoo
(Continued)

FOREIGN PATENT DOCUMENTS

CN 112550207 A * 3/2021 ........... B60R 21/213
DE 602004008546 T2 5/2008
(Continued)

OTHER PUBLICATIONS

Translation of CN-112550207-A.*
(Continued)

*Primary Examiner* — Paul N Dickson
*Assistant Examiner* — Shams Dhanani
(74) *Attorney, Agent, or Firm* — Tarolli, Sundheim, Covell & Tummino LLP

(57) ABSTRACT

The invention describes a vehicle occupant restraint system (10) comprising at least one vehicle seat (12) and at least one inflatable airbag (14) associated with the vehicle seat (12), wherein the airbag (14) is mounted above the associated vehicle seat (12), and wherein the airbag (14) when inflated has a base body (16) whose envelope is wedge-shaped in the vertical direction and which, when inflated, overlaps at least to a certain extent with the vehicle seat (12) in the vertical direction.

20 Claims, 4 Drawing Sheets

(56) References Cited

U.S. PATENT DOCUMENTS

Figure 1:
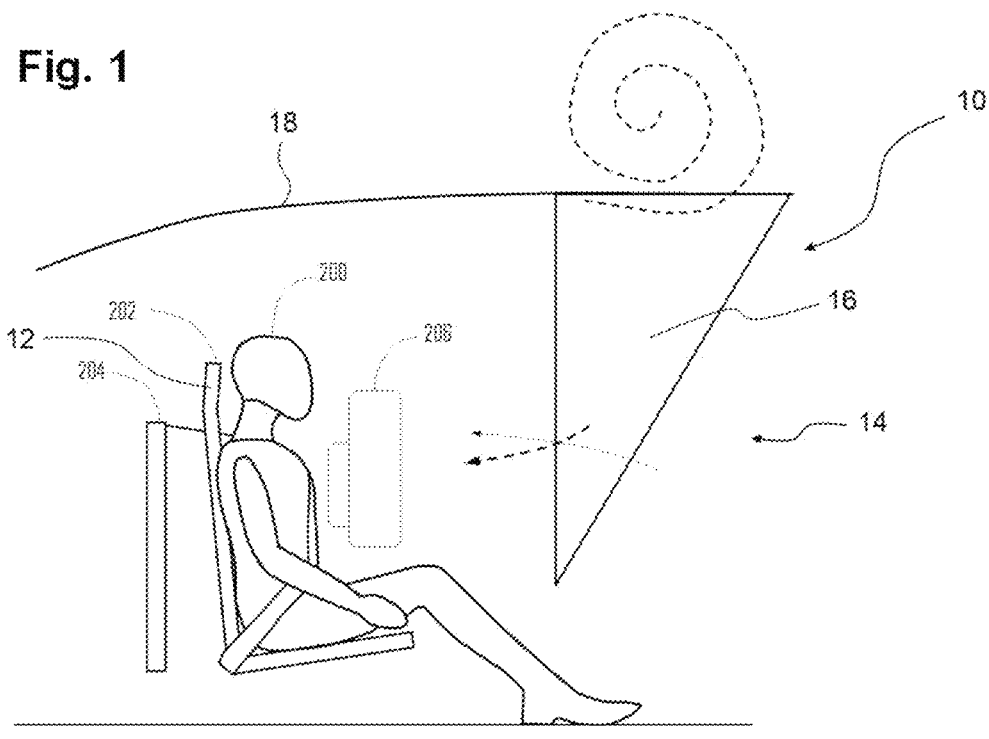

| | | | | |
|---|---|---|---|---|
| 9,446,733 | B2 | 9/2016 | Pausch et al. | |
| 10,358,108 | B2 | 7/2019 | Jung et al. | |
| 11,001,220 | B2 | 5/2021 | Fukawatase | |
| 11,465,579 | B1* | 10/2022 | Faruque | B60R 21/013 |
| 11,565,648 | B1* | 1/2023 | Christiansen | B60R 21/2334 |
| 11,577,682 | B1* | 2/2023 | Bates | B60R 21/214 |
| 11,845,392 | B1* | 12/2023 | Faruque | B60R 21/2338 |
| 12,005,850 | B2* | 6/2024 | Nakajima | B60R 21/239 |
| 2004/0090055 | A1* | 5/2004 | Kassman | B60R 21/01512 280/743.2 |
| 2005/0073135 | A1* | 4/2005 | Choi | B60R 21/232 280/730.1 |
| 2005/0184494 | A1* | 8/2005 | Sakata | B60R 21/207 280/736 |
| 2015/0343986 | A1* | 12/2015 | Schneider | B60R 21/205 280/729 |
| 2017/0113646 | A1* | 4/2017 | Lee | B60R 21/2338 |
| 2017/0240285 | A1* | 8/2017 | Strobl | B64D 11/06205 |
| 2018/0312130 | A1* | 11/2018 | Min | B60R 21/13 |
| 2019/0054884 | A1* | 2/2019 | Dry | B60R 21/2342 |
| 2019/0071046 | A1* | 3/2019 | Dry | B60R 21/233 |
| 2019/0161048 | A1* | 5/2019 | Thomas | B60R 21/264 |
| 2019/0217804 | A1* | 7/2019 | Cho | B60R 21/233 |
| 2019/0299912 | A1* | 10/2019 | Tanaka | B60R 21/233 |
| 2019/0375363 | A1* | 12/2019 | Abe | B60R 21/233 |
| 2020/0070767 | A1* | 3/2020 | Kuepper | B60R 21/2171 |
| 2020/0086820 | A1* | 3/2020 | Gould | B60R 21/214 |
| 2020/0139923 | A1 | 5/2020 | Ostling et al. | |
| 2020/0377052 | A1* | 12/2020 | Youssef-Agha | B60R 21/231 |
| 2020/0384939 | A1* | 12/2020 | Rutgersson | B60R 21/015 |
| 2020/0391688 | A1* | 12/2020 | Schroeder | B60R 21/239 |
| 2022/0144203 | A1* | 5/2022 | Sung | B60R 21/214 |
| 2022/0332268 | A1* | 10/2022 | Jaradi | B60R 21/233 |
| 2024/0025370 | A1* | 1/2024 | Faruque | B60R 21/2338 |

FOREIGN PATENT DOCUMENTS

| | | | | |
|---|---|---|---|---|
| DE | 19859988 | A1 | 6/2010 | |
| DE | 102014013649 | A1 | 3/2016 | |
| DE | 102017115095 | A1 | 1/2019 | |
| DE | 102018124805 | A1 | 4/2019 | |
| DE | 102019118843 | A1 * | 1/2021 | B60R 21/207 |
| JP | 2016030545 | A | 3/2016 | |
| JP | 2018008661 | A | 1/2018 | |

OTHER PUBLICATIONS

Translation of DE-102019118843-A1.*
PCT International Search Report for corresponding International Application Serial No. PCT/EP2022/070736, mailed Nov. 21, 2022, pp. 1-6.

* cited by examiner

VEHICLE OCCUPANT RESTRAINT SYSTEM

RELATED APPLICATIONS

This application is a U.S. National Stage Application filed under 35 USC 371, claiming priority to Serial No. PCT/EP2022/070736, filed on 25 Jul. 2022; which claims priority from the German Patent Application 10 2021 119 336.2, filed 26 Jul. 2021, the entireties of which are hereby incorporated herein by reference.

The invention relates to a vehicle occupant restraint system comprising an airbag.

Vehicle occupant restraint systems comprising airbags are known and are typically used in automotive vehicles to support a vehicle occupant in the case of need.

In the future, the requirements to the flexibility of vehicle occupant restraint systems will increase as, when autonomous driving becomes more widespread, a sitting position adopted by the vehicle occupants can vary significantly more depending on the driving situation than is currently the case. In addition, alternative vehicle concepts, such as autonomously driving people movers, are provided in which the vehicle seats or vehicle bench seats are oriented so that the vehicle occupants sit opposite each other. Due to the more strongly varying sitting position of the vehicle occupant, a path of movement covered by a vehicle occupant in the case of need can be different and specifically definitely longer than is the case with a conventional driving mode.

Therefore, it is an object of the present invention to provide a vehicle occupant restraint system that is adapted to support a vehicle occupant in different sitting positions in a particularly safe manner.

This object is achieved, according to the invention, by a vehicle occupant restraint system comprising at least one vehicle seat and at least one inflatable airbag associated with the vehicle seat, wherein the airbag is mounted above the associated vehicle seat, and wherein the airbag, when inflated, has a base body whose envelope is wedge-shaped in the vertical direction and which, when inflated, in the vertical direction overlaps at least to a certain extent with the vehicle seat.

The airbag is particularly stable due to the wedge shape of the base body. In accordance with the invention, the airbag is self-supporting, which means that the restraint of a vehicle occupant can be safeguarded based on the inherent stability of the inflated airbag.

The base body and, resp., the envelope of the base body tapers downwards in the vertical direction, for example.

As seen in a lateral view, the base body has the contour of a triangle, in particular a right triangle. The side of the base body directed to the vehicle seat can be at right angles with a vehicle roof. However, the angles can also deviate from the rectangular shape or the vertical orientation, respectively.

In addition, the lateral surfaces of the base body and the envelope, resp., need not be plane, but one or more of the surfaces may be curved.

Preferably, the base body is attached to the vehicle roof and in the inflated state extends downwards from the roof. Thus, the base body can rest on the vehicle roof, which also contributes to high stability of the airbag.

According to one embodiment, the base body is formed by plural fabric tubes which in the inflated state of the airbag constitute the lateral edges of the base body. In this way, the advantage of requiring less gas for inflating the airbag and of the airbag deploying particularly quickly is achieved.

Alternatively, the base body can be formed by a mat-shaped body comprising plural tubular chambers which are produced, for example, by connection of the two outer walls. Furthermore, the base body can also be formed as a mat-shaped body whose outer walls are connected to each other, for example, by sewn-in tethers or, in a one-piece woven airbag, by woven-in tethers so as to produce a base body having an as small volume as possible.

For a wedge completely fillable with gas a large quantity of gas is required and the deployment takes correspondingly long time. For quick deployment, a suitable number of inflators is required.

On the side of the airbag remote from the vehicle seat, preferably plural parallel channels are formed in the airbag. The channels can also be formed by fabric tubes. The channels ensure additional stabilization of the base body in the inflated state. More precisely, the channels prevent or reduce twisting of the airbag in the case of load.

The channels extend from the roof to a lower end of the airbag, for example.

On the base body of the airbag, an extension chamber may be arranged which is in fluid communication with the base body and which deploys upon inflation of the airbag at the head and/or torso height of a vehicle occupant toward the associated vehicle seat. The extension chamber provides the airbag with a particularly large reach, i.e., a distance of the base body from a vehicle occupant can be bridged at least to a certain extent by the extension chamber. In this way, particularly proper support of the head and the torso of a vehicle occupant can be ensured.

As an alternative, an extension chamber which deploys toward the associated vehicle seat at the head and/or torso height of a vehicle occupant upon inflation of the airbag and which is not in fluid communication with the base body can be arranged on the base body of the airbag. In such an embodiment, the base body is preferably connected to a first inflator for filling the base body and the extension chamber is connected to a second inflator through a filling channel. In this way, it can be easily achieved, for example, that the base body and the extension chamber have a different internal pressure in the inflated and filled state.

When not inflated, the airbag preferably has a rolled folding, the airbag being rolled in the direction away from the associated vehicle seat. This rolling direction of the rolled folding helps prevent the head of a vehicle occupant from slipping behind the airbag during deployment of the airbag. In particular, the head or torso of a vehicle occupant is prevented from being urged downwards by the airbag. In addition, or as an alternative, the airbag can have at least partly a concertina folding.

On a side of the base body facing away from the vehicle seat, according to one embodiment an extension chamber is arranged which is in fluid communication with the base body and forms a spacer, specifically from a vehicle structure or a further airbag, when the airbag is inflated. This additionally ensures an improved stabilization of the airbag. For example, the airbag rests on a screen associated with the vehicle seat via the spacer.

According to one embodiment, at least one restraining device restricting a movement of the airbag in the inflated state is fastened to the base body, particularly wherein the restraining device is fastened to a lower end of the base body. The at least one restraining device can help additionally stabilize the airbag. The restraining device is a pull strap or a gas-filled tube, for example.

The vehicle seat and the associated airbag can be supported on a joint carrier. In this way, the airbag is prepositioned relative to the vehicle seat.

The carrier is a suspended profile section curved in C-shape, a cabin or seat pan, for example.

The carrier is preferably rotatably and/or movably mounted. Consequently, the airbag moves along with the vehicle seat when the vehicle seat is adjusted, i.e., the airbag is optimally oriented relative to the vehicle seat in any position of the vehicle seat.

The carrier can be rotatably and/or movably mounted on an upper side and a lower side. In this way, the carrier is held stably and the vehicle seat is prevented from wobbling.

For example, the carrier is mounted on a rotatable cylinder or a rotatable plate. A vehicle seat can be mounted on a vehicle floor by means of a cylinder or a plate over a larger area than by mount in one discrete pivot.

Preferably, the cylinder or the plate is rotatable about 360°.

The cylinder may have a plate-shaped radial projection, with a heel stop being formed integrally with the projection. This ensures optimum positioning of the feet of a vehicle occupant.

According to one embodiment, two vehicle seats are provided which are facing each other at least in one sitting position, and a separate airbag is associated with each vehicle seat, the airbags being arranged between the two vehicle seats. Thus, with the vehicle seats being oriented opposite to each other, vehicle occupants can be stabilized on both seats by a respective associated airbag supported in itself.

Figure 2:
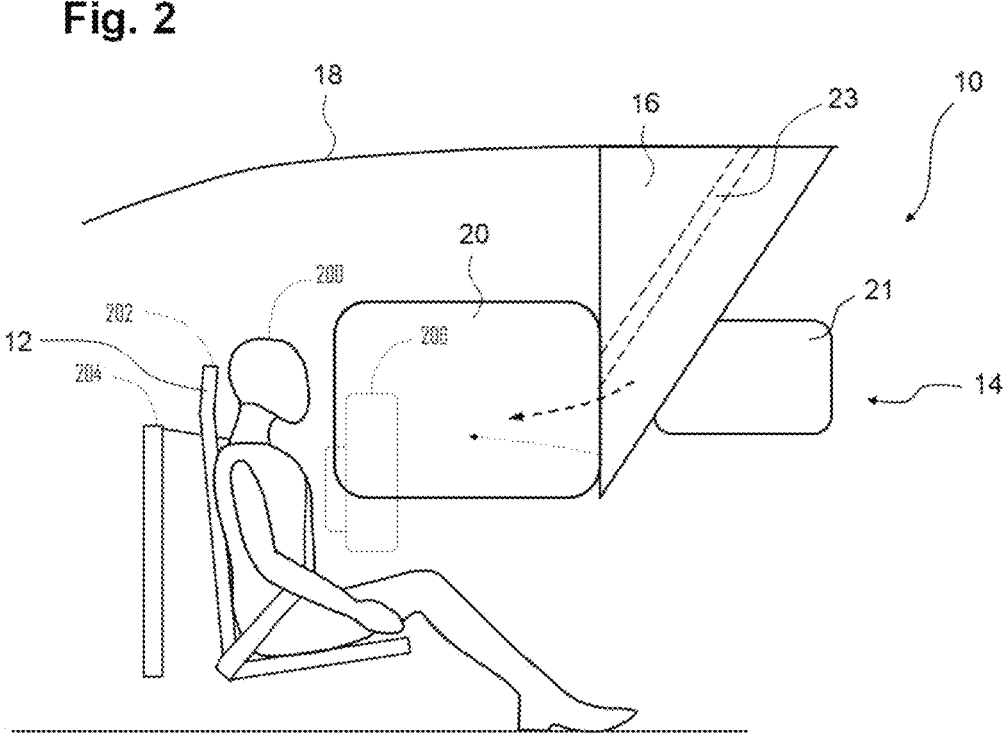
Figure 3:
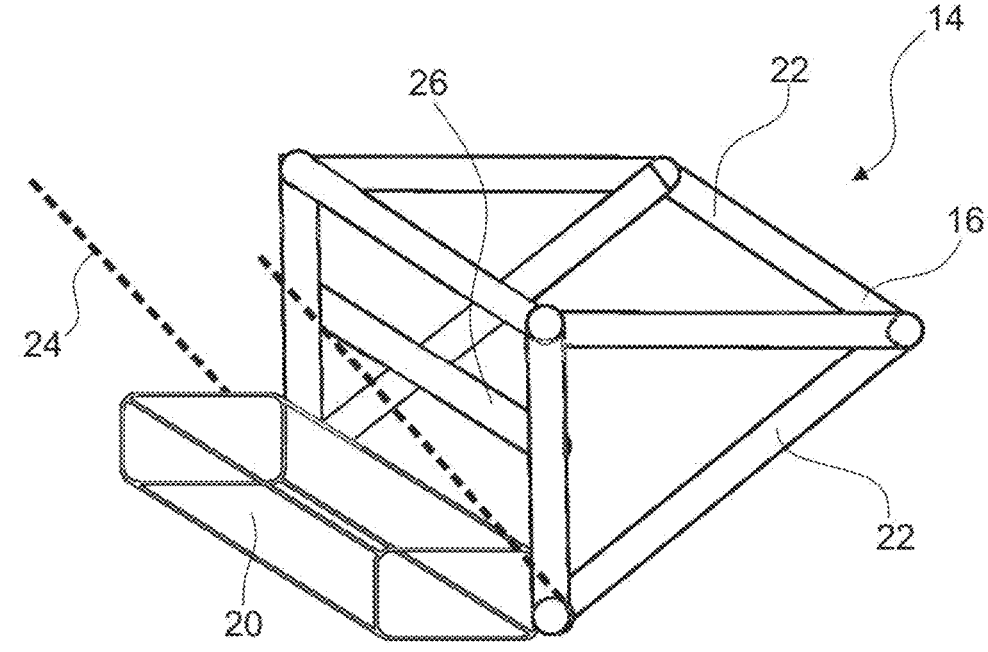
Figure 4:
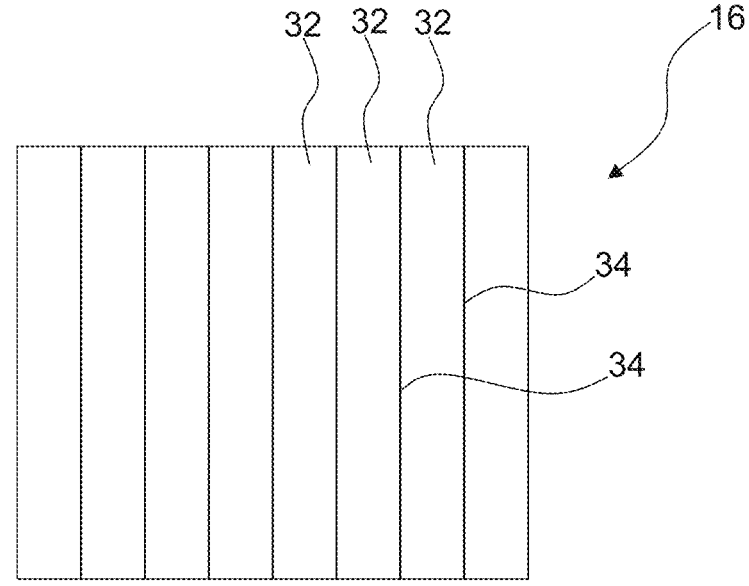
Figure 5:
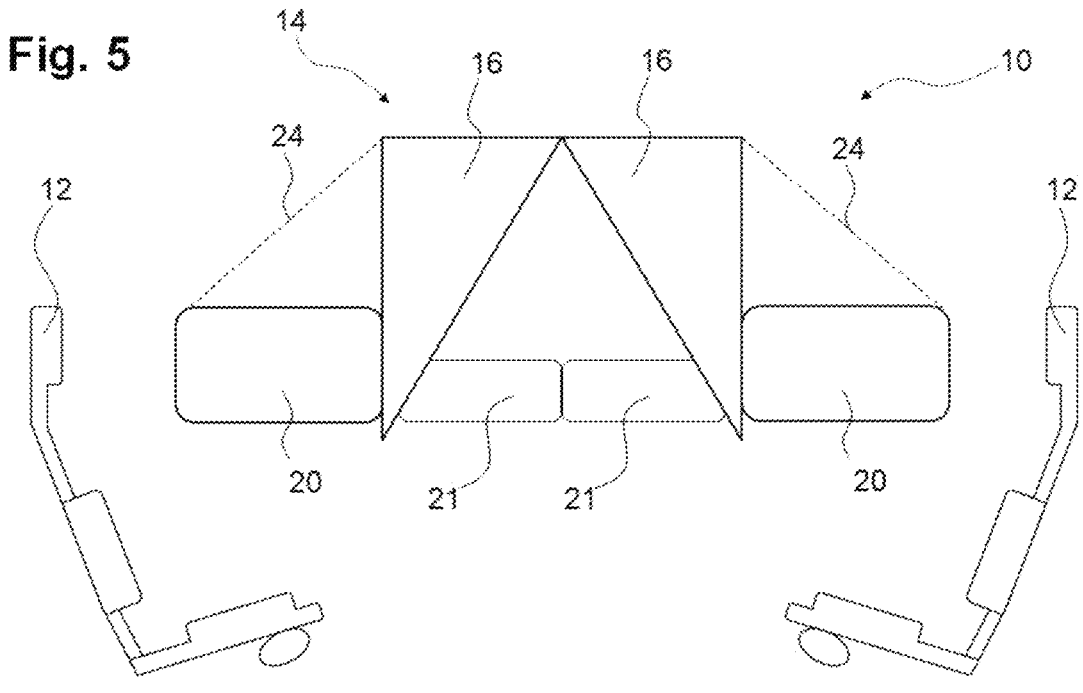
Figure 6:
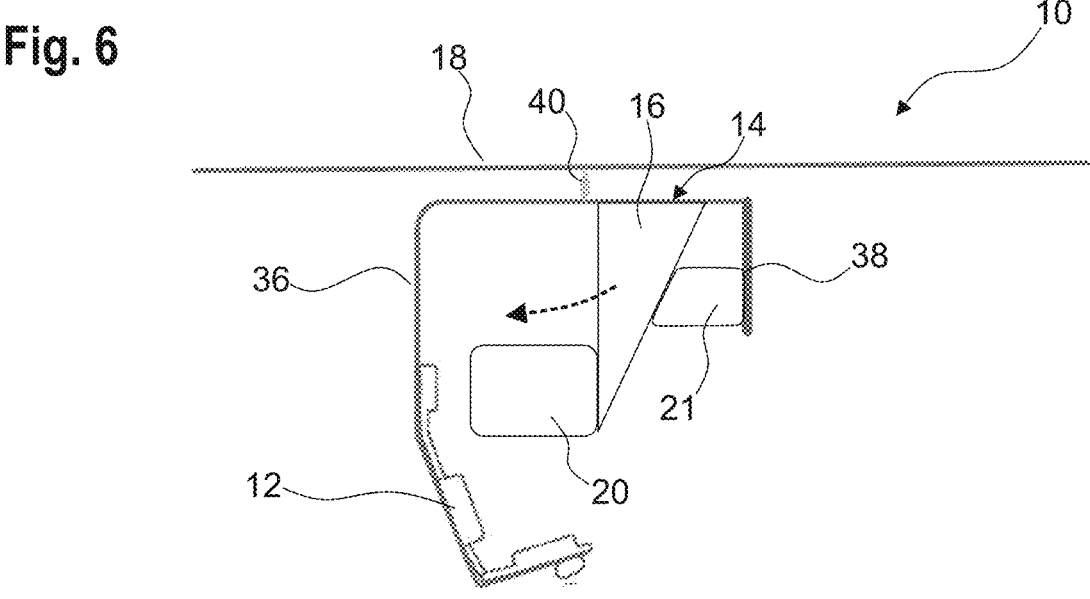
Figure 7:
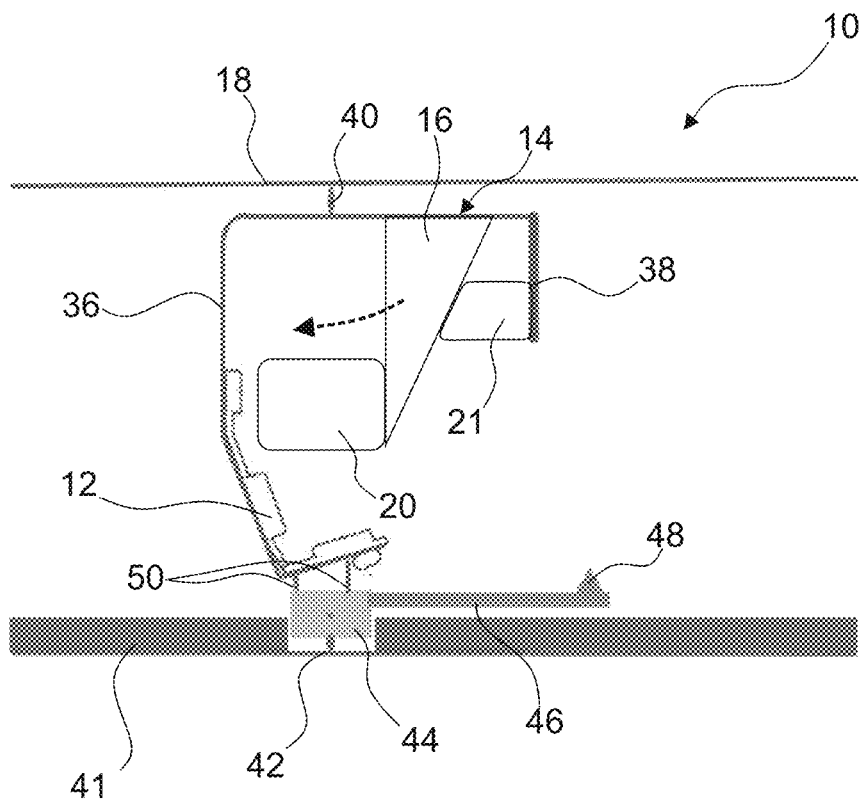

Further advantages and features of the invention will be evident from the following description and from the attached drawings which are referred to and wherein:

FIG. 1 schematically shows a vehicle occupant restraint system according to the invention, FIG. 2 schematically shows a vehicle occupant restraint system according to the invention as set forth in a further embodiment, FIG. 3 schematically shows an airbag for a further vehicle occupant restraint system according to the invention, FIG. 4 schematically shows a rear view of an airbag for a vehicle occupant restraint system according to the invention, FIG. 5 schematically shows a further vehicle occupant restraint system according to the invention, FIG. 6 schematically shows a vehicle occupant restraint system as set forth in a further embodiment according to the invention, and FIG. 7 schematically shows a vehicle occupant restraint system as set forth in a further embodiment according to the invention.

FIG. 1 schematically illustrates a vehicle occupant restraint system 10 for an automotive vehicle.

The vehicle occupant restraint system 10 comprises a vehicle seat 12 and an inflatable airbag 14 associated with the vehicle seat 12.

For inflating the airbag 14, one or more inflators can be provided which are not shown in the Figures for convenience.

The vehicle seat 12 can be supported to be rotatable about a vertical axis, specifically about at least 160°, preferably about 360°.

The airbag 14 has a base body 16 which in the inflated state overlaps in the vertical direction at least to a certain extent with the vehicle seat 12.

The envelope of the base body 16 is wedge-shaped in the vertical direction. In other words, the envelope of the base body 16 is triangular in a lateral view.

In the illustrated example configurations, the triangle is a right triangle, the side directed to a vehicle occupant being perpendicular to a vehicle roof 18. However, one can deviate from the rectangular shape.

The base body 16 of the airbag 14 is attached to the vehicle roof 18 and, when inflated, extends downwards from the vehicle roof 18.

When it is not inflated, the airbag 14 has a rolled folding, i.e., in a direction away from the associated vehicle seat 12. This is schematically illustrated in FIG. 1 by a broken line which represents the side of the base body 16 directed to the vehicle seat 12.

In the non-inflated state, the airbag 14 is arranged behind a roof liner, for example.

FIG. 2 schematically illustrates a further vehicle occupant restraint system 10.

The vehicle occupant restraint system 10 according to FIG. 2 differs from the system of FIG. 1 by the fact that two extension chambers 20, 21 are additionally provided.

The first extension chamber 20 is in fluid communication with the base body 16 and upon inflation of the airbag 14 deploys at the head and/or torso height of a vehicle occupant toward the associated vehicle seat 12. Thus, the vehicle occupant can be stabilized even better in his/her sitting position.

As an alternative, it is possible that the first extension chamber 20 is not in fluid communication with the base body 16 and is filled via a filling channel 23 by a separate inflator. In so doing, it can be easily achieved that the base body and the extension chamber have a different internal pressure in the inflated state.

The second extension chamber 21 is arranged on a side of the base body 16 directed away from the vehicle seat 12.

The second extension chamber 21, too, is in fluid communication with the base body 16.

When the airbag 14 is inflated, the second extension chamber 21 forms a spacer, specifically from a vehicle structure or another airbag 14.

Both extension chambers 20, 21 are optional and can be provided individually or in combination.

The extension chambers 20, 21 do not necessarily have to be block-shaped, as shown in the Figures, but the extension chambers 20, 21 may have bumps or hollows.

FIG. 3 schematically shows an airbag 14 which can be used alternatively in the vehicle occupant restraint systems 10 according to FIG. 1 or FIG. 2.

In the airbag 14 shown in FIG. 3, the base body 16 is formed by plural fabric tubes 22 which, when the airbag 14 is inflated, constitute the lateral edges of the base body 16. Such a base body 16 has a comparatively small volume to be inflated so that the airbag 14 according to FIG. 3 deploys particularly quickly.

As an option, a horizontally extending cross member 26 which is also formed by a fabric tube can be provided on a side of the base body 16 facing the vehicle occupant.

FIG. 3 also illustrates two optional restraining devices 24 which by one end are fastened to the airbag 14 and, by another end, are fastened to a vehicle structure. The airbag 14 is stabilized in the inflated state by the restraining devices 24 in a restraining position.

The restraining devices 24 are pull straps or fabric tubes, for example.

Alternatively, the base body 16 can be formed, as a matter of course, also as a solid body or of plural mat-shaped elements having tubular chambers as the remote side of an airbag 14 shown in FIG. 4.

FIG. 4 schematically illustrates a side of the airbag 14 remote from the vehicle seat 12 according to a further embodiment.

The side remote from the vehicle seat 12 is formed by plural parallel channels 32 in the airbag 14. As a result, the airbag 14, specifically the base body 16, is particularly stable.

The channels 32 can be formed by seams 34 in two superimposed fabric layers.

Alternatively, the channels 32 can be formed by individual fabric tubes.

The channels 32 are in fluid communication with the remainder of the base body 16 and preferably with each other so that the channels 32 equally inflate when the airbag 14 is inflated.

FIG. 5 shows a vehicle occupant restraint system 10 comprising two vehicle seats 12 which are opposite to each other at least in the illustrated sitting position.

Each vehicle seat 12 is associated with a separate airbag 14, the airbags 14 being arranged between the two vehicle seats 12.

Each of the two airbags 14 includes the extension chambers 20, 21 described in connection with FIG. 2.

The extension chambers 21 directed away from the vehicle seat and serving as spacers are adjacent to each other so that the two airbags 14 mutually bear against each other in the inflated state.

In addition, the two extension chambers 20 directed toward the vehicle seat are connected to an upper end of the base body 16 by a restraining device 24.

The two airbags 14 are supported relative to each other by the extension chambers 21 and the restraining devices 24, allowing the airbags 14 to be excellently stabilized.

FIG. 6 schematically shows a further vehicle occupant restraint system 10.

According to the embodiment shown in FIG. 6, the vehicle seat 12 and the associated airbag 14 are supported on a joint carrier 36.

The airbag 14 also has the extension chambers 20, 21 described in connection with FIG. 2.

The extension chamber 21 in the illustrated example configuration serves as a spacer from a vehicle structure, specifically from a monitor 38 which is equally supported on the carrier 36.

The carrier 36 is rotatably and/or movably mounted, by a suspension 40 at the vehicle roof 18 in the example configuration. In this way, the vehicle seat 12 can be flexibly positioned.

FIG. 7 schematically shows a further vehicle occupant restraint system 10.

The vehicle occupant restraint system 10 illustrated in FIG. 7 differs from the vehicle occupant restraint system 10 illustrated in FIG. 6 in that the carrier 36 is rotatably and/or movably mounted on an upper side and a lower side, which ensures particularly stable support.

The pivots of the suspension 40 and of the support 42 provided on the vehicle floor 41 are superimposed in the vertical direction.

The support 42 is implemented by a rotatably mounted cylinder 44.

A plate-shaped radial projection 46 on which a vehicle occupant can put his/her feet extends from the cylinder 44.

A heel stop 48 is integrally formed with the projection 46 for better support of the vehicle occupant, specifically to obtain optimum positioning of the legs of a vehicle occupant.

The vehicle seat 12 is connected to the cylinder 44 in plural supporting points 50, which also contributes to a stable support of the vehicle seat 12.

Instead of a cylinder 44 having a projection 48, the vehicle seat 12 can be mounted on a rotatable plate on the vehicle floor. A heel stop can also be integrally formed with the plate.

The cylinder 44 or the plate, resp., is preferably rotatable about 360°.

The invention claimed is:

1. A vehicle occupant restraint system comprising at least one vehicle seat and at least one inflatable airbag associated with the vehicle seat, wherein the airbag is mounted above the associated vehicle seat, and wherein the airbag when inflated has a base body whose envelope is wedge-shaped in the vertical direction and which, when inflated, overlaps at least to a certain extent with the vehicle seat in the vertical direction, and wherein the system further comprises a suspension configured to connect the base body to the vehicle roof and to allow the airbag to rotate relative to the vehicle.

2. The vehicle occupant restraint system according to claim 1, wherein the base body when inflated extends downwards from the roof.

3. The vehicle occupant restraint system according to claim 1, wherein the base body is formed by plural fabric tubes which, when the airbag is inflated, form the sides of the base body.

4. The vehicle occupant restraint system according to claim 1, wherein plural parallel channels are formed in the airbag on the side remote from the vehicle seat.

5. The vehicle occupant restraint system according to claim 1, wherein an extension chamber which is in fluid communication with the base body and which deploys at the head and/or torso height of a vehicle occupant toward the associated vehicle seat, when the airbag inflates, is arranged on the base body of the airbag.

6. The vehicle occupant restraint system according to claim 1, wherein an extension chamber which deploys at the head and/or torso height of a vehicle occupant toward the associated vehicle seat, when the airbag inflates, is arranged on the base body of the airbag, wherein the base body is connected to and fillable by a first inflator and the extension chamber is connected to and fillable by a second inflator via a filling channel.

7. The vehicle occupant restraint system according to claim 1, wherein the airbag in the non-inflated state has a rolled folding, the airbag being rolled in the direction away from the associated vehicle seat.

8. The vehicle occupant restraint system according to claim 1, wherein an extension chamber which is in fluid communication with the base body and which, when the airbag is inflated, forms a spacer from a vehicle structure or a further airbag, that is arranged on a side of the base body directed away from the vehicle seat.

9. The vehicle occupant restraint system according to claim 1, wherein at least one restraining device which restricts movement of the airbag in the inflated state is fastened to the base body, in particular wherein the restraining device is fastened to a lower end of the base body.

10. The vehicle occupant restraint system according to claim 1, wherein the vehicle seat and the associated airbag are mounted on a joint carrier.

11. The vehicle occupant restraint system according to claim 10, wherein the carrier is rotatably and/or movably mounted.

12. The vehicle occupant restraint system according to claim 10, wherein the carrier is rotatably and/or movably mounted on an upper side by the suspension and on a lower side.

13. The vehicle occupant restraint system according to claim 10, wherein the carrier is mounted on the lower side by a rotatably cylinder or a rotatable plate.

14. The vehicle occupant restraint system according to claim 13, wherein the carrier is mounted on a rotatably cylinder including a plate-shaped radial projection, a heel stop being formed integrally with the projection.

15. The vehicle occupant restraint system according to claim 10, wherein the airbag further comprises an extension chamber which is in fluid communication with the base body and which, when the airbag is inflated, forms a spacer that is arranged on a side of the base body directed away from the vehicle seat configured to stabilize the airbag.

16. A vehicle occupant restraint system comprising at least one vehicle seat and at least one inflatable airbag associated with the vehicle seat, wherein the at least one inflatable airbag comprises:

an inflatable wedge-shaped base body is mounted above the associated vehicle seat, the base body being configured when inflated to overlap at least to a certain extent with the vehicle seat in the vertical direction;

a first extension chamber connected to the base body on a side of the base body facing the associated vehicle seat, the first extension chamber being in fluid communication with the base body and being configured to deploy at the head and/or torso height of a vehicle occupant toward the associated vehicle seat; and a second extension chamber connected to the base body on a side of the base body facing away from the associated vehicle seat, the second extension chamber being configured to form a spacer from a vehicle structure or another airbag.

17. The vehicle occupant restraint system according to claim 16, wherein the base body comprises a tubular wedge-shaped frame comprising a plurality of interconnected tubular segments.

18. The vehicle occupant restraint system according to claim 16, further comprising a suspension configured to connect the base body to the vehicle roof and to allow the airbag to rotate relative to the vehicle.

19. The vehicle occupant restraint system according to claim 16, further comprising at least one restraining device fastened to the base body and configured to restrict movement of the airbag in the inflated state.

20. The vehicle occupant restraint system according to claim 16, wherein the vehicle seat and the associated airbag are mounted on a joint carrier that is rotatably and/or movably mounted to the vehicle.

* * * * *